Figure 1:
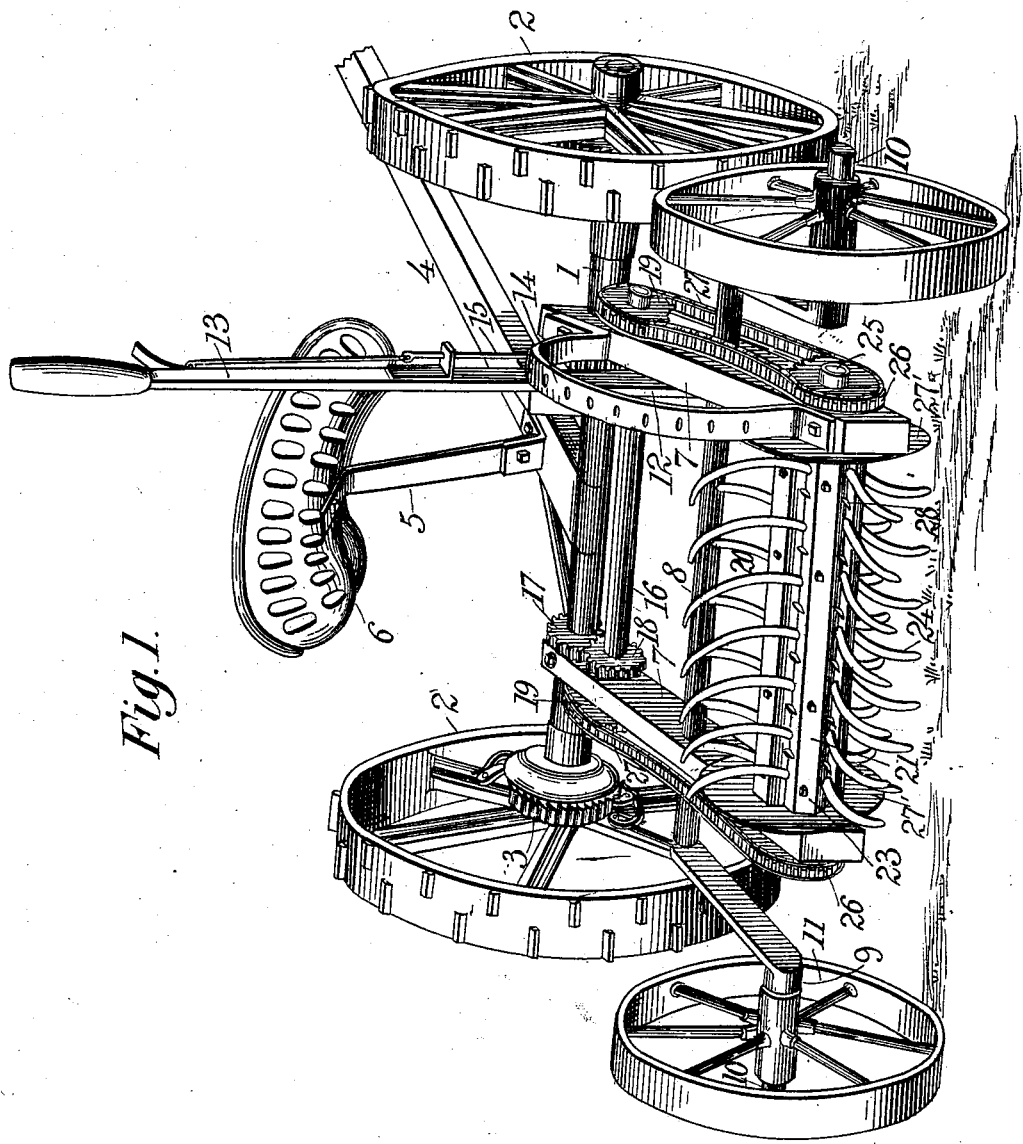

No. 694,429. Patented Mar. 4, 1902.
M. SCHICHTL.
REVERSIBLE ROTARY HARROW AND CULTIVATOR.
(Application filed July 8, 1901.)

(No Model.) 2 Sheets—Sheet 1.

Witnesses:
J. S. Bowen
J. W. Garner

Martin Schichtl, Inventor
by C. A. Snow & Co.
Attorneys

No. 694,429. Patented Mar. 4, 1902.
M. SCHICHTL.
REVERSIBLE ROTARY HARROW AND CULTIVATOR.
(Application filed July 8, 1901.)
(No Model.) 2 Sheets—Sheet 2.
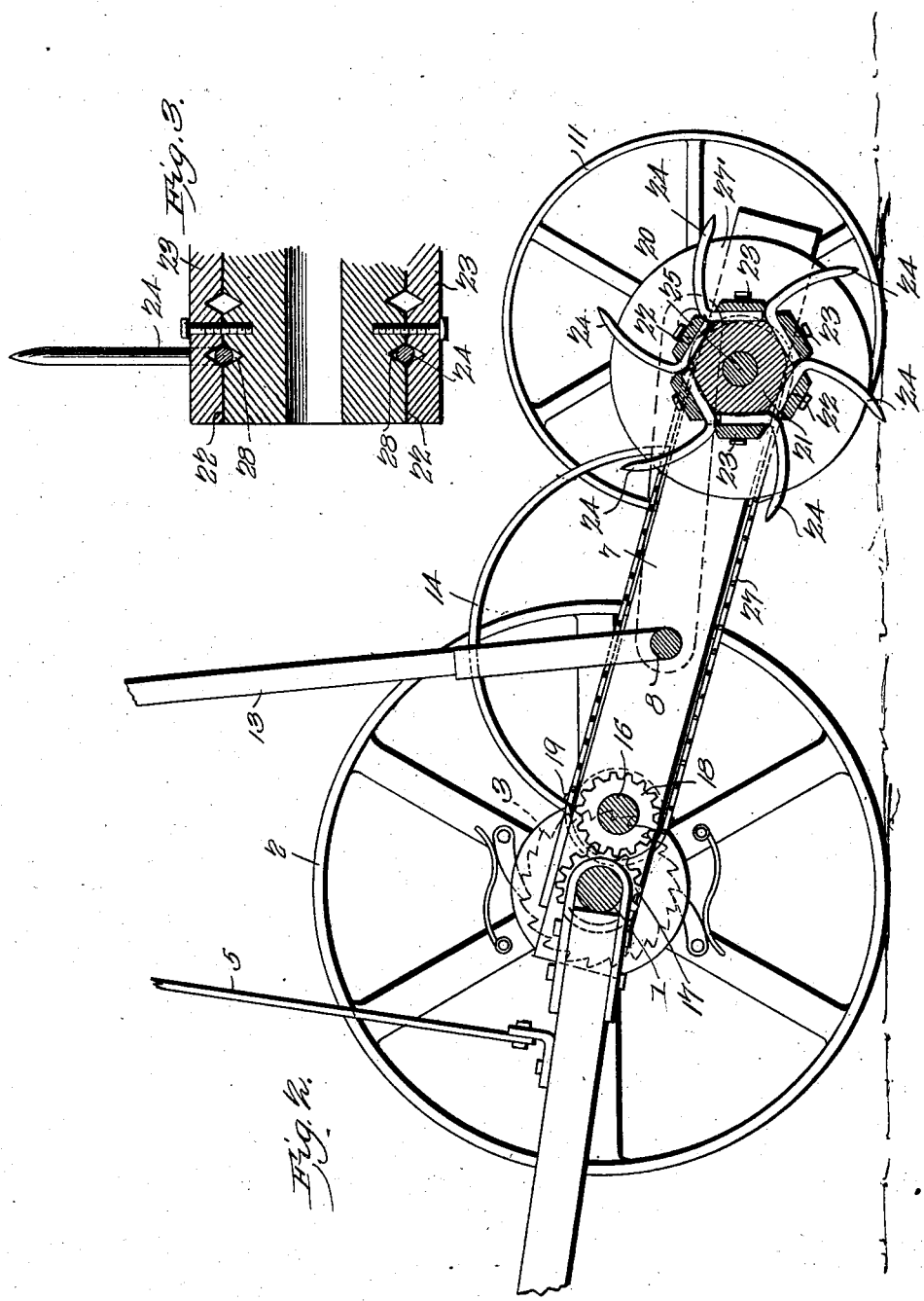

UNITED STATES PATENT OFFICE.

MARTIN SCHICHTL, OF NORTH YAKIMA, WASHINGTON.

REVERSIBLE ROTARY HARROW AND CULTIVATOR.

SPECIFICATION forming part of Letters Patent No. 694,429, dated March 4, 1902.

Application filed July 8, 1901. Serial No. 67,491. (No model.)

*To all whom it may concern:*

Be it known that I, MARTIN SCHICHTL, a citizen of the United States, residing at North Yakima, in the county of Yakima and State of Washington, have invented a new and useful Reversible Rotary Harrow and Cultivator, of which the following is a specification.

My invention is an improved reversible rotary harrow and cultivator; and it consists in the peculiar construction and combination of devices hereinafter fully set forth and claimed.

In the accompanying drawings, Figure 1 is a perspective view of a reversible rotary harrow and cultivator constructed in accordance with my invention. Fig. 2 is a vertical longitudinal sectional view of the same. Fig. 3 is a detail sectional view of the revoluble harrow.

On the axle-shaft 1, at the front end of the machine, are journaled the ground-wheels 2, which are loose on the said axle-shaft and are connected thereto by pawl-and-ratchet mechanisms, as at 3, by means of which said axle-shaft is rotated by said ground-wheels and the machine is enabled to be readily turned. The draft-tongue 4 is attached to the central portion of the axle-shaft, and on the said draft-tongue is mounted a bar 5, which supports the seat 6 for the driver.

A vertically-movable frame, which comprises the side bars 7, extends rearwardly from the axle-shaft, the front ends of said side bars being pivotally connected to said shaft, whereby the rear end of said frame is adapted to be raised and lowered. The intermediate cranked portion 8 of an axle 9 has its bearings in the side bars 7 at points about midway between the ends thereof. On the spindles 10 of said cranked axle are mounted the rear wheels 11. A rock-arm 12 is secured to the said cranked axle and is provided with a hand-lever 13, the upper end of which is within convenient reach of the driver. By means of the said hand-lever the said cranked axle may be partly turned to raise or lower the rear end of the frame. On one of the side bars 7 is a detent-arc 14, which may be engaged by a dog 15, with which the hand-lever 13 is provided, to lock said hand-lever, and hence the said cranked axle, at any desired adjustment.

A shaft 16 is journaled in bearings in the side bars 7 and is disposed in rear of axle-shaft 1. The latter has a spur-wheel 17, which engages a similar wheel 18 on shaft 16, and hence conveys power thereto. Said shaft 16 is provided at its ends with sprocket-wheels 19.

A revoluble harrow 20 is journaled at the rear end of the frame and comprises a cylinder or stock 21, which is angular in cross-section to form the faces 22, clamping-bars 23, which are disposed and bolted on said faces, harrow-teeth 24, which are clamped between the said faces 22 and said bars 23, and the central shaft 25. The said shaft has its bearings in the side bars 7. On the ends of the said shaft are sprocket-wheels 26, which are connected to the sprocket-wheels 19 by endless sprocket-chains 27ª. Thereby power is communicated to the said revoluble harrow, and when the machine is in motion the said revoluble harrow is rotated in the direction indicated by the arrow in Fig. 2, the harrow-teeth moving forwardly in the soil in the direction of the movement of the machine. By raising or lowering the harrow the teeth thereof may be caused to operate in the soil at any desired depth. By raising the harrow sufficiently the teeth thereof may be brought entirely out of engagement with the soil.

At the ends of the cylinder or stop 22 of the harrow are disks 27, the same cut in the soil and prevent lateral movement of the harrow. The harrow-teeth may be either of the form shown in the drawings or of any other suitable form. The stock or cylinder 22 and the bars 23 are provided in their opposing sides with transverse openings 28 for the reception of the intermediate portions of the harrow-teeth, and the said openings are substantially V-shaped in cross-section to form clamping-surfaces in the stock and the clamping-bars to engage the said harrow-teeth and prevent the same from turning. Any desired number of these openings may be provided. A harrow-tooth may be secured in each of the said openings or harrow-teeth may be secured in alternate openings or otherwise to appropriately spaced the harrow-teeth apart. Cultivator-teeth of suitable form may be substituted for the harrow-teeth. The machine may be either driven by an operator on the seat 6 or the driver may walk in rear of the machine. In either event the lever 13 may be operated by the driver for the purposes hereinbefore described.

Having thus described my invention, I claim—

1. In a machine of the class described, the combination of an axle-shaft, ground-wheels thereon to rotate said axle-shaft, a frame having its front side pivotally connected to said axle-shaft, a revoluble element, as a harrow, carried at the rear side of said frame, a cranked axle connected to said frame and supporting the rear side thereof, supporting-wheels on said cranked axle, a lever to turn said cranked axle, and thereby raise or lower the rear side of said frame, and said revoluble element, and power connections between said revoluble element and said axle-shaft, substantially as described.

2. In a machine of the class described, a revoluble stock having angular faces, in combination with clamping-bars disposed on said angular faces and teeth clamped between said stock and said clamping-bars, substantially as described.

3. In a machine of the class described, a revoluble element having implements for stirring the soil, and disks at the ends of said revoluble element, for the purpose set forth, substantially as described.

4. In a machine of the class described, the combination of a revoluble stock having angular faces, clamping-bars on said angular faces, said clamping-bars and said stock having transverse angular openings on their opposing sides and soil-stirring teeth having their shanks disposed in said openings and clamped between said stock and said bars, substantially as described.

In testimony that I claim the foregoing as my own I have hereto affixed my signature in the presence of two witnesses.

MARTIN SCHICHTL.

Witnesses:
IRA P. ENGLEHART,
GEO. S. COURTER.